US008635604B2

(12) United States Patent
Castillo et al.

(10) Patent No.: US 8,635,604 B2
(45) Date of Patent: *Jan. 21, 2014

(54) SYSTEM AND METHOD FOR CONVERTING GRAPHICAL CALL FLOWS INTO FINITE STATE MACHINES

(71) Applicant: AT&T Intellectual Property II, L.P., Atlanta, GA (US)

(72) Inventors: Cecilia Castillo, Lebanon, NJ (US); Theodore J. Roycraft, Califon, NJ (US); James M. Wilson, Berkeley Heights, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/765,136

(22) Filed: Feb. 12, 2013

(65) Prior Publication Data

US 2013/0158985 A1 Jun. 20, 2013

Related U.S. Application Data

(63) Continuation of application No. 13/099,805, filed on May 3, 2011, now Pat. No. 8,381,200, which is a continuation of application No. 10/826,062, filed on Apr. 16, 2004, now Pat. No. 7,945,903.

(51) Int. Cl.
*G06F 9/45* (2006.01)
*G06F 9/44* (2006.01)

(52) U.S. Cl.
USPC .......................................... 717/140; 717/105

(58) Field of Classification Search
USPC .................................................. 717/105, 140
See application file for complete search history.

(56) References Cited

U.S. PATENT DOCUMENTS

| | | | |
|---|---|---|---|
| 4,686,623 A | 8/1987 | Wallace | |
| 5,754,760 A | 5/1998 | Warfield | |
| 6,219,643 B1 | 4/2001 | Cohen et al. | |
| 6,321,198 B1 | 11/2001 | Hank et al. | |
| 6,785,643 B2 * | 8/2004 | Hayosh et al. | 704/9 |
| 6,823,054 B1 | 11/2004 | Suhm et al. | |
| 7,143,042 B1 | 11/2006 | Sinai et al. | |
| 7,184,967 B1 | 2/2007 | Mital et al. | |
| 2003/0041314 A1 | 2/2003 | Heeren et al. | |
| 2003/0046626 A1 | 3/2003 | Hand et al. | |
| 2003/0066051 A1 | 4/2003 | Karr et al. | |
| 2003/0217190 A1 | 11/2003 | Devine et al. | |
| 2006/0025997 A1 | 2/2006 | Law et al. | |

OTHER PUBLICATIONS

Jerry R. Hobbs et al., "Fastus: An Information Extraction System" Artifical Intelligence Center, SRI International, Menlo Park, California 94025, http://www.ai.sri.com/~israel/fastus_brief2.pdf, 4 pages.

* cited by examiner

*Primary Examiner* — Samuel G Neway

(57) ABSTRACT

A method, system and module for automatically converting a call flow into a state-based representation are disclosed. The method comprises walking a call flow and converting each page of the call flow into a rule of a higher level representation of the call flow, augmenting the higher level representation with terminal symbols representing state variable assignments and comparisons associated with decision and computation shapes in the call flow and converting the higher level representation into a state-based representation.

16 Claims, 2 Drawing Sheets

SYSTEM AND METHOD FOR CONVERTING GRAPHICAL CALL FLOWS INTO FINITE STATE MACHINES

RELATED APPLICATIONS

The present application is a continuation of U.S. patent application Ser. No. 13/099,805, filed May 3, 2011, which is a continuation of U.S. patent application Ser. No. 10/826,062, filed Apr. 16, 2004, now U.S. Pat. No. 7,945,903 and is related to U.S. patent application Ser. No. 10/826,064, filed Apr. 16, 2004, the contents of which are incorporated herein by reference.

BACKGROUND OF THE INVENTION

1. Field of the Invention

The present invention relates to spoken dialog systems and more specifically to a system and method of converting graphical call flows into finite state machines.

2. Introduction

A spoken dialog system is typically represented by a call flow. The call flow is essentially a graph or network, possibly containing cycles over parts of the network. The incorporated application above discloses a rooted tree having a root node, descendent nodes, and leaf nodes. A path from the root node to a leaf node represents a specific dialog. A call flow can contain huge (tens of thousands) or even unbounded numbers of unique dialogs.

Typically, a spoken dialog developer will manually inspect the call flow to generate dialog test cases and scenarios for testing the spoken dialog system. This is a time consuming process and is prone to error. This translation, if done by hand, is prone to error, misinterpretation, and can be time and resource time consuming. What is needed is a system and method for converting the call flow into another representation that is useful for implementing the call flow in a spoken dialog service and useful for testing the implemented spoken dialog service.

SUMMARY OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

The present invention permits a call flow specification represented in Microsoft Visio (or similar tools) to be translated into an augmented Backus-Naur Form (BNF), which can in turn be represented as a finite state machine (FSM). It faithfully represents the specification and enables a family of other dialog tools to be used to test, check, and even implements the call flow. The time and cost to develop, test and monitor dialog systems can be greatly reduced using the techniques disclosed herein.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

The invention includes several embodiments for converting call flows into structures such as a state-based representation, preferably a finite-state machine (FSM). The embodiments include a method of converting a call flow into an FSM, a tool or module for converting the call flow into an FSM, a computer-readable medium storing computer-executable instructions for converting the call flow into an FSM or similar state-based representation and a spoken dialog system that is tested using the tool or method disclosed herein.

Figure 1:
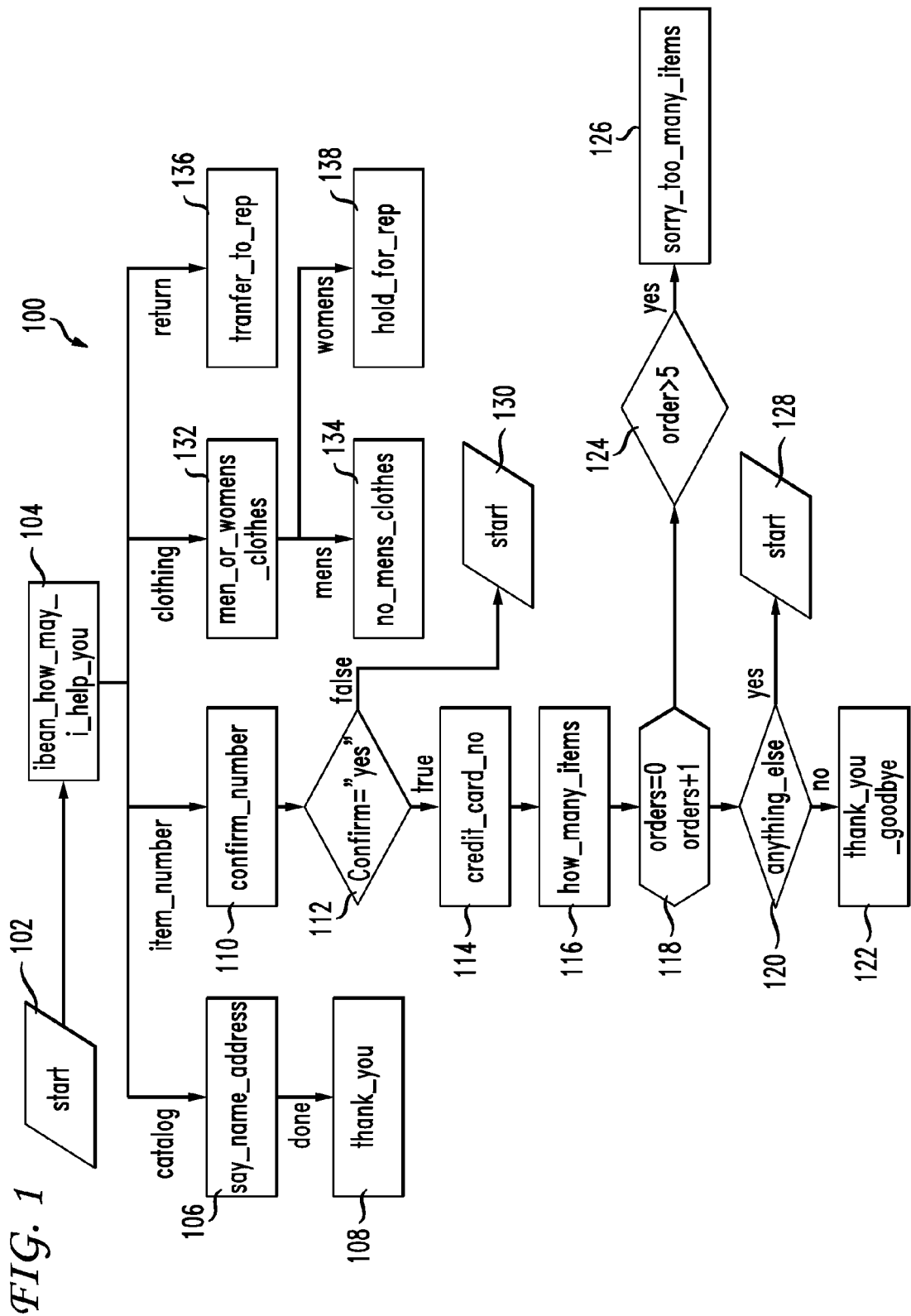
FIG. 1 illustrates an example call-flow for a spoken dialog system.

As mentioned above, a call flow is typically developed for a particular spoken dialog system. The call flow represents all the possible inquiries from a user of the system and the possible responses. FIG. 1 illustrates an example call-flow 100 for a mail order company. The call-flow 100 illustrates how a phone customer could accomplish one of four tasks: (1) request a catalog; (2) buy by item by item number; (3) inquire about clothing; or (4) request a return. During the course of the conversation with the customer, the dialog progresses through the call-flow 100 guided by the customer's utterances and the spoken dialog system responds to the customer with prompts.

Each state (point) in the call-flow 100 can have one or more state variables associated with the state. These variables can have string or numeric values and can be created, tested or changed as the dialog progresses through the call-flow 100 and the values of these variables can affect the flow.

The shapes of the boxes on the call-flow have special meanings. The parallelograms refer to a starting state. The rectangles represent prompts to customers. The diamonds are state variable boolean tests and the hexagons reflect state variable manipulation.

Lines with arrows show possible transitions between states and each arrow is labeled by what is determined to be the customer's intent. So, for example, after the starting point 102, the first prompt is "How may I help you?" 104. In response, the customer may say "I'd like to order item number B453 from your catalog". Other software in the system determines the customer's intent from this response. This is typically determined from a dialog manager module in the spoken dialog system. In this example, the intent is determined to be "item_number" and thus this path in the call-flow 100 is followed. The prompt asks the user to confirm the item number 110 and if the confirmation is affirmative ("yes") 112, then the prompt asks for a credit card number 114 and the number of items 116. In this call-flow, the system increments the number of items on order 118 and determine whether a threshold has been reached 124. If yes, then the system prompts that too many items have been ordered 126. If the threshold is not reaches, then system asks if the customer would like anything else 120 and if yes, it starts over 128. If no, then the prompt says good bye and thank you 122.

If the user at stage 104 asks for clothing, the system asks for clothing for men or women cloths 132. If the clothing is for men, the system states that they have no mens clothing 134. If the response is that cloths for women are desired, then the prompt holds for a representative 138. If the user responds at stage 104 that they want to return an item, the system tells the user that they will be transferred to a representative 136.

If the user's utterance indicates a desire for a catalog, the prompt 106 asks for the customer to say their name and address. Once that is received, the system says "thank you" 108 and completes the process.

In this manner, the spoken dialog system steps through the call-flow. It can be appreciated that there are many variations of call-flows depending on the type of application. FIG. 1 only provides an example for the purpose of illustrating the present invention.

The representation of the call-flow in FIG. 1 is a convenient way for the call-flow designer to view the call-flow but that is not a suitable form for the runtime system to use. For that, a process converts the call-flow form to an augmented context free grammar notation. This notation is preferably a Backus-Naur Form (BNF) representation. The BNF is a text language used to specify the grammars of programming languages. The following augmented BNF representation of the call-flow of FIG. 1 was created from a Visio representation of the call-flow by a dialog manager designer program.

```
// dmdesigner
// File: llbean.vsd
// Created: 3/24/2003 10:41:12 AM
// Total number of pages: 1
#define WATSON_INSERT_SILENCE 2
// page Page-1
// Warning: shape orders=orders+1 missing labeled line
// Warning: shape orders=orders+1 missing labeled line
// Error: decision orders>5 must have two branches
<start> = llbean_how_may_I_help_you\out
   ( catalog\in say_name_address\out done\in thank_you\out |
   item_number\in confirm_number\out
      ( Confirm\eqyes credit_card_no\out
      how_many_items\out orders\add1
         (sorry_too_many_items\out |
         anything_else\out
            ( yes\in <start> |
            no\in thank_you_goodbye\out)) |
      Confirm\neyes <start>) |
   clothing\in men_or_womens_clothes\out
      ( mens\in no_mens_clothes\out |
      womens\in hold_for_rep\out) |
   return\in transfer_to_rep\out) ;
// Rule list errors/warnings:
// Rule map list: rule name, page name, page index, shape
index, page refs
//    start,         "Page-1",     1,    1,    "Page-1,34,Page-1,18,"
// State variable list:
//    _null
//    _tracelevel
// Warning: state variable Confirm referenced but not defined - see
page,shape# Page-1,0,
//    Confirm
//    orders
// Input function list: name, page ref
//    catalog          Page-1,0,
//    clothing         Page-1,0,
//    done             Page-1,0,
//    item_number      Page-1,0,
//    mens             Page-1,0,
//    no               Page-1,0,
//    return           Page-1,0,
//    womens           Page-1,0,
//    yes              Page-1,0,
// Output function list: name, page ref
//    anything_else    Page-1,0,
//    confirm_number   Page-1,0,
//    credit_card_no   Page-1,0,
//    hold_for_rep     Page-1,0,
//    how_many_items   Page-1,0,
//    llbean_how_may_I_help_you Page-1,0,
//    men_or_womens_clothes   Page-1,0,
//    no_mens_clothes  Page-1,0,
//    say_name_address Page-1,0,
//    sorry_too_many_items    Page-1,0,
//    thank_you        Page-1,0,
//    thank_you_goodbye       Page-1,0,
//    transfer_to_rep  Page-1,0,
// Default function list: name, page ref
// Tag function list: function name, page name, page index,
shape index
// 3 Warnings
// 1 Errors
// 1 Rule Names
// 0 Tag Functions
// 9 Input Functions
// 13 Output Functions
// 0 Default Functions
// 4 State Variables
```

The BNF is called augmented because in addition to simply naming the state transitions, a naming convention is used to assign additional meanings to the state transitions. A suffix in the form '\xyz' is added to the transition name to give that transition a special meaning.

For example, in the demonstration, the first prompt is 'llbean_how_may_I_help_you\out'. The '\out' suffix indicates that this is a prompt and the name of the prompt is 'llbean_how_may_I_help_you'. Similarly, 'item_number\in' represents the user intent (or category) to place an order by item number. Some of the valid suffixes and meanings are:

| | | |
|---|---|---|
| a. <PromptName>\out | - prompt using <PromptName>, e.g. hello\out | |
| b. <category>\in | - category (or user intent) named <category>, e.g. buy\in | |
| c. <var>\set<value> | - set state variable <var> to <value>, e.g. counter\set0 | |
| d. <var>\add<value> | - add <value> to state variable <var>, e.g. counter\add4 | |
| e. <var>\eq<value> | - is <var> equal to <value>?, e.g. counter\eq0 | |
| f. <var>\ne<value> | - is <var> not equal to <value>?, e.g. counter\ne0 | |
| g. etc. | | |

Normally, a BNF network representation consists of a sequence of terminal and non-terminal elements connected by binary operations, e.g. "and", "or", which guide the path through the BNF network. A sequence of input tokens causes the network to be traversed as long as the network accepts (matches) the list of input tokens with the current terminal. Eventually, either a terminal state (final state) will be reached or else a terminal state won't be reached because the sequence of input tokens was not compatible with the BNF network.

In the augmented BNF, the notion of terminals is extended. Normally, terminals are fixed entities such as "dog", "cat", etc. An aspect of the present invention involves extending the notion of terminals by first creating a set of classes of terminals. Within each class, different terminals of that class may be defined by name. For one example implementation, if classes are chosen as "in", "out", numeric and string operators, "tag", "def", and "func" are defined. The "in" classes are used to match input tokens and to execute a particular generated function when that input terminal name is matched by an input token; "out" classes are used to represent "output" actions (such as issuing a prompt) when that terminal is reached; "tag" terminals are executed as the process passes through them and are generally used to mark progress through the network typically for logging and tracing.

Operator classes can test or modify the values of state variables and change the flow based on the operator and the values it operates on. If a test is 'true', the process passes to the next state; if it is false, the path is blocked.

State variables consist of a set of string or numeric variables associated with each state in the network. As the process glides through the network, states that are passed through inherit the values of the state variables from the previous state but have their own copy. State variables that are modified by a downstream state don't affect state variables that are upstream in the network.

The "func" terminals cause the named function to be executed as the process passes through that terminal. That function may return a value that either blocks passage through that terminal or permits passage.

Normally, to pass through a terminal, an input token must match it. In the augmented BNF, the only terminal that must be matched by an input token is the "in" class token. All others are simply passed through to the next terminal as long as the actions performed for that particular terminal permit passage through it. For those terminals other than the "in" class, as they are passed through, certain actions are implied based on the type of class that is passed through. It is also possible for actions specific to that particular augmented terminal to take place. Because it is possible that there are multiple valid paths out of a particular state (the network is nondeterministic), the process must "look ahead" in the network until it comes to a blocking state or the process finishes successfully at a final state. If the process encounters a blocking path, it must backtrack to the previous state and check the next valid path out of that state. This is done recursively until it eventually finds a path that ends up at a valid final state or it is determined that there is no valid path to the final state.

Since the process must backtrack at times, it keeps the set of state variables on a stack. As the process moves to a new state, it makes a copy of all the state variables and pushes the set of them on the stack. If the process has to backtrack, it pops the last state off the stack to restore a valid state to the state the process backtracked to.

A related patent application, U.S. patent application Ser. No. 10/826,064, filed Apr. 16, 2007, incorporated herein by reference, discloses the "dmRun" tool, which automatically generates C++ code from the augmented BNF. For each specific terminal, a template C++ function is generated for that terminal. Also, for each class of terminal, a common function is created for that class. When the application is running, as the process passes from terminal to terminal, the common function for that terminal class is executed as well as the specific function for that particular terminal. For example, if the process passes through terminal "giraffe", then the functions "out_common( . . . )" as well as "out giraffe( . . . )" are executed. The idea is that the programmer can fill in the common functions with actions that are common to all terminals of that class and if it is necessary, the programmer can fill in the specific generated functions with code specific to that terminal, in this case "giraffe". The following text illustrates an augmented BNF that implements a loop that initializes a variable ('count' in this case), and decrements it in a loop and exits when the count is zero. As long as the value of 'count' is greater than zero, the loop continues. When the value of 'count' is zero, the loop terminates.

```
<start> = go\in count\set6 <_start1>;
<_start1> = put\out (count\le0 done\out | count\gt0 count\sub1
<_start1>);
```

This loop BNF was created by hand but it could have been created as a Visio diagram and converted to a BNF by the dm-designer tool disclosed herein. The following code illustrates the power of augmented BNFs by showing how square roots could be computed using the Newton-Raphson method using augmented BNFs.

```
<start> = go\in xinit\@setxsquared <_start1>;
<_start1> = x2\@setxinit x2\@mulx2 x2\@subxsquared x2\div2.0
x2\@divxinit xnew\@setxinit xnew\@subx2 xdiff\@setxinit xdiff\@
subxnew
xinit\@setxnew (xdiff\gt.00001 enroute\out <_start1> | def\def done\in
done\out);
```

The process disclosed herein provides for a method automatically generating from a graphical representation of a call flow, a BNF that embodies the call flow. The method also provides for automatically inserting special terminal symbols into the BNF to support debugging and profiling of dialogs.

The process makes novel use of the fact that a call flow can be represented by an equivalent BNF. The process parses a call flow written in Microsoft Visio. (This method could be applied to other graphical representation tools that support programmatic access to the graphical shapes). The process assumes that the call flow is written in a proscribed manner that will support the parser. The call flow is constructed from one or more Visio pages. As shown in FIG. 1, each page contains a set of Visio shapes that have specific meanings:

Parallelograms represent rules
Lines represent dialog inputs
Rectangular boxes represent dialog outputs or actions
Diamonds represent Boolean decision functions
Hexagrams represent calculation and assignment functions
Annotation shapes represent comments Most shapes are assigned labels. A rule is labeled with a rule name. Inputs are labeled with values that are needed to traverse down the associated line. Furthermore, input labels can be disjunctions or omitted (always permitting traversal). Outputs are labeled and represent actions to be taken when the call flow reaches that shape. Diamonds contain simple Boolean expressions that reference state variables, counters, and input. Hexagrams contain assignment and increment/decrement statements for all variables (state variables, counters, etc.).

Each page contains a basic dialog block. The block contains a distinguished rule connected to one or more rules (other than itself), decision, calculation and output functions. Input lines connect all shapes. Within a block loops are implicit. A block loops back to the distinguished rule by referring to the rule elsewhere on the page. State variables are introduced via assignment functions. They are dynamically typed as integers, floats, and strings. Counters are special cases of state variables. Pages are linked together by their distinguished rule names; it is also how the flow branches from one page to another.

The first page of the call flow is the starting page. The distinguished rule on that page represents the entry point to the flow. Typically, the rule will be followed by a set of assignment functions to initialize state variables and counters and then be followed by an output action (such as play an opening prompt). One or more lines covering the inputs to be enacted upon will follow the output action. There is also a special default line label that acts as the default if no other inputs match. The input lines will lead to further output actions, decision functions, assignment functions, and rule names.

Figure 4:
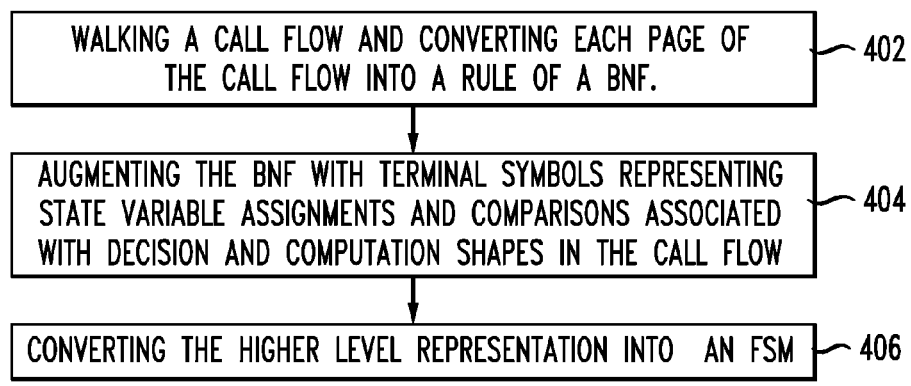
FIG. 4 illustrates the method embodiment of the invention.

FIG. 4 illustrates the method embodiment of the invention. The process walks the call flow and converts each page into a rule of a higher level representation of the call flow (402). This representation may be a context-free grammar representation and preferably is a BNF. A rule is composed of a rule name enclosed in angled brackets (< >) followed by an equal sign followed by a sequence of terminal symbols and rule names followed by a semicolon. For example, a simple call flow is presented in FIG. 2. At the start parallelogram (202), the system asks a question (an output action) "do you need help?" (204) and then receives a response. If the response is "no", then the GetName rule is invoked (206). If the response is "yes", then the ProvideHelp rule is invoked (208). If any other response is given, then the TryAgain rule is invoked (210). All three rules, GetName, ProvideHelp, and TryAgain, are defined on other pages.

Figure 2:
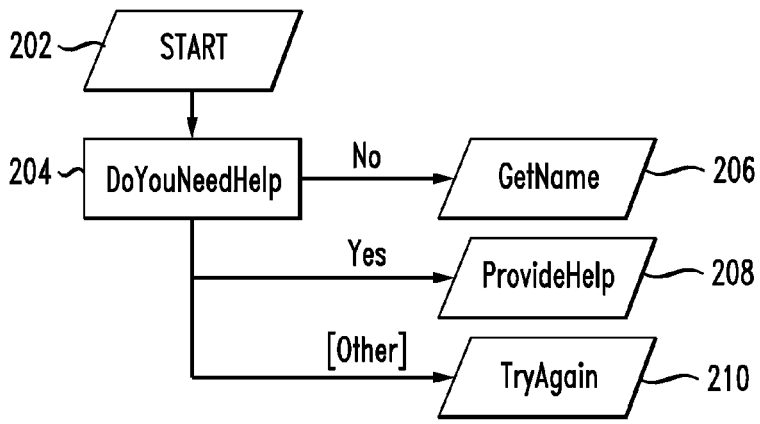
FIG. 2 illustrates an embodiment of the present invention.

The flow shown in FIG. 2 can be represented in a BNF as

```
<start> = DoYouNeedHelp\out
    (Yes\in <ProvideHelp> | No\in <GetName> | Other\def
    <TryAgain>);
```

The terminal symbols of the BNF are composed of the names used to label the shapes corresponding to the rules, lines, and outputs. Inputs and output names are suffixed with strings "\in" and "\out" to indicate the class of function they are associated with, e.g., "yes\in", "DoYouNeedHelp\out". A sequence of symbols is separated by spaces. Pipes (|) denote disjunction or alternatives in the flow. Parentheses can be used to group actions. A default input line that matches any input has a label delimited by square brackets ([ ]), as in "[Other]". This input is represented as "Other\def".

Continuing with the method of FIG. 4, the method comprises augmenting the BNF is augmented with special terminal symbols that represent the state variable assignments and comparisons to support the decision and computation shapes (404). Finally, the method comprises converting the higher level representation into a state-based representation such as an FSM (406). These steps preferably occur automatically and are processed by a computing device. The computing device and programming language are immaterial to the present invention. The FSM is then available for use by various tools that can be used in various processes associated with generating and testing spoken dialog services or various components of a spoken dialog service. The preferable method to convert the BNF to an FSM is to apply the Watson grammar compiler to convert the BNF to an FSM and its associated wordlist. This compiler performs a mapping of string labels in the FSM to numerical labels to provide an FSM of the augmented BNF.

Figure 3:
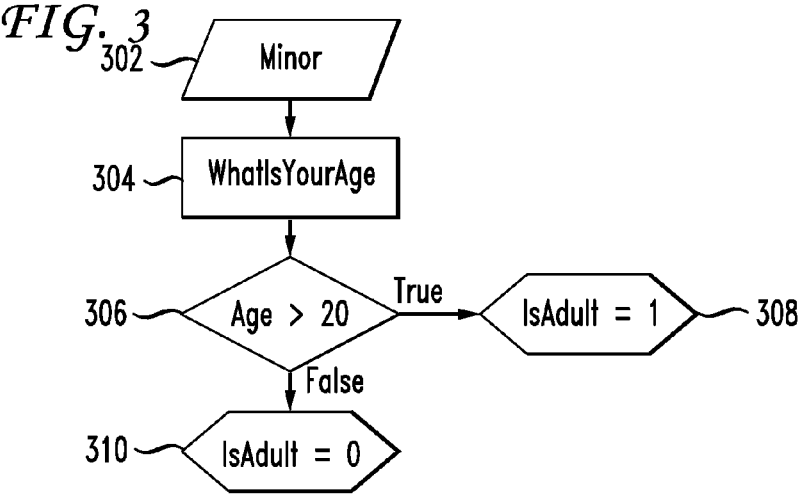
FIG. 3 illustrates a simple flow.

FIG. 3 illustrates a simple flow where the state variables Age and IsAdult are used. This flow includes a minor parallelogram (302) that leads to the WhatisYourAge rule (304). If the response is that the age is over 20 (306), then the output is to set a parameter IsAdult to one (308). If the person is not over 20, then the parameter IsAdult is set to zero (310). The corresponding rule for this flow is:

```
<minor> = WhatIsYourAge\out
    (Age\gt20 IsAdult\set1 |
    Age\le20 IsAdult\set0);
```

This invention can also generate a unique terminal symbol that shadows each rule, input, output, decision, and calculation. These shadow symbols are called tags. Tags can be used by run time dialog systems to profile automatically every node and edge visited at run time. This can provide valuable diagnostic feedback on how a system is performing.

This invention reduces the risk of call flow specifications being incorrectly coded by automatically generating BNFs that correspond to call flows. In addition, other dialog analysis tools (see Automatic Validation of Dialog Run Time Systems and Automatic Generation of Dialog Test Cases and Scenarios) are dependent upon BNFs to enable them to test, execute, and validate dialog systems. This invention will allow companies to provide a standard means of generating BNFs from call flows from which other standard tools can feed. It can also reduce the need for highly skilled developers to translate call flows into code and enable user interface designers and system engineers to implement call flows.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. The computer, as would be known, includes a processor that is controlled by program modules to perform certain functions. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. For example, the invention is not limited to generating BNF's or FSM's in the process of automatically generating test dialog sentences. No specific programming language is required for programming the automated process. Accordingly, the appended claims and their legal equivalents should only define the invention, rather than any specific examples given.

We claim:

1. A method comprising:
   converting, via a processor, a call flow into a higher level representation with state variable assignments and comparisons dependent on shapes in the call flow, the higher level representation having a syntax used to specify grammars of a programming language;
   upon converting the call flow into the higher level representation, augmenting the higher level representation to yield an augmented higher level representation by:
      creating classes of terminal states found in the higher level representation;
      associating each class in the classes with a function, to yield, for each terminal state, a functional class;
      modifying each terminal state based on the function associated with the functional class of the terminal state; and
      associating a meaning with a state transition in the higher level representation by attaching, to an output of the state transition, a suffix associated with the meaning; and
   converting the augmented higher level representation into a state-based representation.

2. The method of claim 1, wherein the higher level representation is a context-free grammar representation.

3. The method of claim 1, wherein the higher level representation is a Backus-Naur Form.

4. The method of claim 1, wherein the state-based representation is a finite state machine.

5. The method of claim 3, wherein converting the call flow to the Backus-Naur Form occurs automatically via the processor.

6. The method of claim 3, wherein converting the higher level representation into the Backus-Naur Form further comprises automatically augmenting the Backus-Naur Form with terminal symbols.

7. The method of claim 1, wherein the call flow comprises a page having a set of shapes having the meaning.

8. The method of claim 7, wherein the set of shapes having the meaning comprises one of parallelograms representing rules, lines representing dialog inputs, rectangular boxes representing one of dialog outputs and actions, diamonds representing Boolean decision functions, hexagrams representing calculation and assignment functions, and annotation shapes representation comments.

9. The method of claim 3, wherein the state-based representation is a finite state machine, and wherein a grammar compiler is used to convert the Backus-Naur Form into the finite state machine.

10. The method of claim 9, wherein the finite state machine may be used by a spoken dialog tool to perform generation and testing functions associated with a spoken dialog service.

11. The method of claim 1, wherein converting the call flow into the higher level representation uses rules which provides labels to shapes and transitions of the call flow.

12. The method of claim 1, further comprising generating a unique terminal symbol in the higher level representation that shadows each rule, input, output, decision and calculation within the call flow.

13. A computer-readable storage device having instructions stored which, when executed by a computing device, cause the computing device to perform operations comprising:
   converting a call flow into a higher level representation, having state variable assignments and comparisons dependent on shapes in the call flow the higher level representation having a syntax used to specify grammars of a programming language;
   upon converting the call flow into the higher level representation, augmenting the higher level representation to yield an augmented higher level representation by:
   creating classes of terminal states found in the higher level representation;
   associating each class in the classes with a function, to yield, for each terminal state, a functional class;
   modifying each terminal state based on the function associated with the functional class of the terminal state; and
   associating a meaning with a state transition in the higher level representation by attaching, to an output of the state transition, a suffix associated with the meaning; and
   converting the augmented higher level representation into a state-based representation.

14. The computer-readable device of claim 13, wherein a grammar compiler is used to convert the higher level representation into the state-based representation.

15. The computer-readable device of claim 14, wherein the grammar compiler augments converting the higher level representation into the state-based representation with suffixes associated with the meaning.

16. The computer-readable device of claim 13, the computer-readable medium having additional instructions stored which result in the operations further comprising:
   creating a unique terminal symbol in the higher level representation that shadows each rule, input, output, decision, and calculation within the call flow.

* * * * *